United States Patent
Gneuss et al.

(10) Patent No.: US 11,491,697 B2
(45) Date of Patent: Nov. 8, 2022

(54) ROTARY SCREEN FILTERING DEVICE FOR MEDIUM TO HIGH-VISCOSITY FLUIDS AND SEALING AND MOUNTING METHOD THEREFOR

(71) Applicant: GNEUSS GMBH, Bad Oeynhausen (DE)

(72) Inventors: Daniel Gneuss, Charlotte, NC (US); Detlef Gneuss, Carabietta (CH); Stephan Gneuss, Bad Oeynhausen (DE)

(73) Assignee: Gneuss GmbH, Bad Oeynhausen (DE)

( * ) Notice: Subject to any disclaimer, the term of this patent is extended or adjusted under 35 U.S.C. 154(b) by 747 days.

(21) Appl. No.: 16/475,194

(22) PCT Filed: Jan. 2, 2018

(86) PCT No.: PCT/DE2018/100000
§ 371 (c)(1),
(2) Date: Jul. 1, 2019

(87) PCT Pub. No.: WO2018/121817
PCT Pub. Date: Jul. 5, 2018

(65) Prior Publication Data
US 2019/0344491 A1    Nov. 14, 2019

(30) Foreign Application Priority Data

Jan. 2, 2017    (DE) .................... 10 2017 100 032.1

(51) Int. Cl.
*B29C 48/691* (2019.01)
*B29C 48/25* (2019.01)

(52) U.S. Cl.
CPC ...... *B29C 48/6914* (2019.02); *B29C 48/2545* (2019.02)

(58) Field of Classification Search
CPC ................... B29C 48/6914; B29C 48/2545
See application file for complete search history.

(56) References Cited

U.S. PATENT DOCUMENTS

| | | |
|---|---|---|
| 4,619,600 A | 10/1986 | Gneuss |
| 6,325,922 B1 | 12/2001 | Schaller et al. |
| 2008/0314815 A1 | 12/2008 | Gneuss et al. |

FOREIGN PATENT DOCUMENTS

| | | |
|---|---|---|
| DE | 3302343 A1 | 8/1984 |
| DE | 102010036810 A1 | 2/2012 |

OTHER PUBLICATIONS

International Search Report of Corresponding International Application No. PCT/DE2018/100000, Filed Jan. 2, 2018.

*Primary Examiner* — Galen H Hauth
(74) *Attorney, Agent, or Firm* — Muncy, Geissler, Olds & Lowe, P.C.

(57) ABSTRACT

On a rotary screen filtering device for medium to high-viscosity fluids, which comprises a rotary screen mounted for rotation in a housing, which screen has at least one screen element through which fluid can flow, the rotary screen, in the region of its sealing faces and the intermediate plates are fabricated or machined together so that they are of identical height. A gap width compensation layer is then inserted between the inlet plate and the intermediate plate and/or between the outlet plate and the intermediate plate. The package of plates is then pretensioned by means of screw bolts in such a manner that all the plates lie firmly against one another up to a maximum permissible operating pressure. Lubrication gaps of defined width are created between the sealing faces and the opposing inner faces of the inlet and outlet plates.

16 Claims, 6 Drawing Sheets

STATE OF THE ART

Fig. 3b

STATE OF THE ART

Fig. 3c

STATE OF THE ART

Fig. 3d

STATE OF THE ART

ROTARY SCREEN FILTERING DEVICE FOR MEDIUM TO HIGH-VISCOSITY FLUIDS AND SEALING AND MOUNTING METHOD THEREFOR

INTRODUCTION

The invention relates to a rotary screen filtering device for medium to high viscosity fluids having the features of the preamble of claim 1 and a sealing and mounting method therefor.

BACKGROUND

When filtering medium to high viscosity fluids, in particular plastic melts, agglomerates or solid particles must be filtered out before the melt can be fed to a processing plant such as an extrusion device. To enable uninterrupted filtering, different types of filter devices are known that allow the replacement of a filter screen during operation by placing a new, non-contaminated screen in the flow channel and removing the contaminated one from it. A particular difficulty in the filtration of plastic melts is that this must be done at high temperatures and high pressures.

A generic filtering device is essentially known from DE 3302343 A1 or DE 3341508 1 A1. DE 10 2010 036 810 A 1 also shows such a rotary screen filtering device. The particular advantages of such a filtering device lie in the fact that a large number of individual screens can be placed on the rotary screen, which are successively flowed through and are easily accessible or can be replaced for cleaning purposes on the side facing away from the flow channel. Due to the continuous rotation, cleaned screens always enter the production flow, while contaminated screens are moved out of the melt flow to be replaced or cleaned. The structural design of the filtering device and its production are also simple and cost-effective due to the layered structure of the housing with plate-shaped elements.

Important and at the same time difficult to control with such a filtering device is the sealing between the rotary screen and the outer housing plates including the intermediate plates, which are inserted between the outer housing plates and enclose the rotary screen at least over a substantial part of its circumference.

The package of outer housing plates and the intermediate plates between them must be pretensioned such that the internal pressure of the fluid does not cause excessive expansion of the housing during operation and leakage spots are avoided, as otherwise too much fluid escapes, resulting in contamination and malfunctions as well as generally in an avoidable loss of raw materials. On the other hand, there must be sufficient mobility of the rotary screen, otherwise it will no longer be rotatable. Thus, a certain minimum lubricating gap width must always exist between the front sealing surfaces on the rotary screen and the opposite contact surfaces on the inlet and outlet plates. A sufficient lubricating gap width is required to allow the fluid to escape very slightly across the seal webs so that the fluid itself forms a kind of lubricating film on both faces of the rotary screen The required lubricating gap width depends on the one hand on the ratio of the height differences of the rotary screen and intermediate elements that form the so-called inner pairing. In addition to this constant factor, there are various influences that change dynamically during operation. These include the viscosity of the fluid to be processed, the volume flow to be achieved, the flow pressure in the area of the screen section and the processing temperature.

A respective adjustment of the height of the rotary screen and the height of the intermediate elements, also positioned between the inlet and outlet plates that enclose the rotary screen, make it possible to adjust a certain gap width, which is however in the range of a few micrometers, so that the manufacture of the intermediate elements and the associated rotary screen, which together form the inner pairing, is very difficult.

Practical experience has shown that on the one hand a very careful calculation and manufacture of the inner pairing is necessary, e.g. by fine grinding or lapping, which entails a correspondingly high machining expenditure, and on the other hand that even with high-precision manufacture the gap width is only optimally set at a certain operating point and for a specific fluid. If the filtering device is operated for a different fluid and/or with changes in the other process parameters, this inevitably leads to changes in the gap widths and thus problems regarding the mobility of the rotary screen or the tightness.

The change in the operating temperature can also lead to changes due to local differences in thermal expansion, even if all the elements combined in the filtering device are uniformly made of steel.

Due to the operating pressure, the filtering device widens from the inside. This, in turn, is counteracted by the respective pretension in the screw connections with which the plates are pressed together and thus also compressed. With a higher pretension there is a risk that the rotary screen will jam, because there is no longer a sufficient lubricating gap at the transition to the stationary part of the housing. However, if the pretension decreases, greater leakage flows may occur, especially if low-viscosity fluids are processed.

Basically, the temperature and pressure-related influences can be calculated for a single operating point and for a specific fluid, so that the nominal values of the respective heights can be calculated. However, each manufacturing process leads to geometric tolerances regarding the height of the elements. Unfavorable pairings can form within the interconnected tolerance zones. In simple and cost-effective machining processes such as milling, the manufacturing tolerances can add up to values that approach or even exceed the required nominal gap width in the filtering device.

For example, a maximum height of the intermediate element and at the same time a minimum height of the rotary screen leads gap width that is too large and thus possibly to large leakage flows. Conversely, a minimum height of the intermediate element combined with the maximum height of the rotary screen leads to a gap width that is too small, a lubricating effect that is too low and thus, possibly, to jamming of the rotary screen during operation.

SUMMARY OF INVENTION

The problem addressed by the present invention is therefore to improve a filtering device such that it can be manufactured cost-effectively and subsequently adapted cost-effectively for use with other fluids and/or other operating parameters.

According to the invention, this problem is solved by a filtering device with the features of claim 1 and a sealing and mounting method with the features of claim 6.

In the following, the term "height" is used to indicate the axial extent of the elements of the inner pairing within the filtering device or to characterize the vertical extent when the rotary screen and the intermediate plates are machined or respectively measured lying on a tool bed or measuring table. It could also be referred to as "thickness" or "layer thickness". In the side view on one of the narrow sides of the filter, the "height" appears rather as the "width".

According to the invention, it is therefore preferable not to attempt to produce the desired gap width by manufacturing the inner pairing, consisting of intermediate element(s) and rotary screen, with the highest precision and correspondingly high costs. Rather, the heights of all elements of the inner pairing are preferably manufactured in one operation and in the same clamping. Thus, the absolute actual values of the height no longer play a role, since there are no more production-related height differences within the inner pairing. Even if the design height is grossly missed during manufacture, this does not entail any disadvantages for the tightness of the filtering device according to the invention.

According to the invention, it is also possible to recondition used filtering devices by levelling the inner pairing, i.e. the rotary screen and the intermediate plates, together, for example by surface grinding. The material removal due to wear and subsequent regrinding of a used filtering device does not have any disadvantage either, since only parts with exactly the same height are obtained within the multi-part set that forms the inner pairing.

According to the invention, the necessary gap width in the filtering device, which usually lies in the range between 5 µm and 50 µm, is not achieved by separate manufacture of the rotary screen and intermediate elements, but rather by an individual gap adaptation layer.

The gap adaptation layer is preferably created in the form of elements that, during assembly, are inserted in at least one of the two separation planes that exist between the intermediate plate and the inlet plate or between the intermediate plate and the outlet plate. This makes it considerably easier to manufacture the inner pairing for the intended purpose of the filtering device, and also makes it easier or even possible to adapt it to changes in the filtering process.

The intermediate plate is supplemented by the gap adaptation layer such that it, together with the gap adaptation layer, creates this distance between the inlet and outlet plates—in the installed state under pretension—that the rotary screen positioned in between can rotate freely and that there is a lubricating gap on both sides between the rotary screen and the inner surfaces of the housing plates. The required height of the lubrication gap is determined taking into account the operating pressure and the viscosity of the fluid.

Normally, the intermediate plate or group of intermediate plates is manufactured with a height representing an undersize to the nominal size of the desired distance between the inlet and outlet plates. A suitable gap adaptation layer is inserted during assembly. In the initial state before assembly, the gap adaptation layer has a height that takes the following influences into account:
  the desired nominal gap width on both sides of the rotary screen as a function of operating pressure and/or viscosity;
  a compression compensation for the compression in the housing and intermediate plates due to the pretension required for the respective operating pressure;
  a compensation for the settlement of the surfaces that occurs when the pretension is applied, depending on the respective surface roughness;
  the tolerance field for the elements of the gap adaptation layer itself; possibly temperature influences due to different thermal expansion behavior in the plates.

The gap adaptation layer can be formed by plate-shaped elements or by strip or foil sections.

Layer elements for the formation of the gap adaptation layer can be manufactured individually, for which the actual height is then determined by measurement. A suitable element can then be selected from a plurality of elements, so that in combination with the intermediate element the desired dimension is achieved.

The gap adaptation layer is particularly preferably formed by at least one section of a rolled metal foil, in particular a cold-rolled steel foil. This is available, for example, in the form of metal strips at low cost and dimensionally very accurate.

The nominal thickness of the gap adaptation layer is preferably determined to be slightly greater than required by calculation. The gap width can then be reduced subsequently if necessary, by increasing the pretension, while the reverse procedure—determining a smaller nominal thickness of the gap adaptation layer and gap width adaptation by reducing the pretension—can possibly lead to leakage flows.

By manufacturing the surfaces of the inner pairing to be machined according to the invention in the same clamping and eliminating any production-related tolerance influences within the group of elements of the inner pairing, a much narrower tolerance field can be introduced for the gap width by using cold-rolled metal strips or foils than would be possible by the individual machining of the rotary screen on the one hand and the intermediate elements on the other hand as provided for in the prior art. While the tolerances for individually manufactured components could add up in the unfavorable manner described above, so that direct influences on the function of the filtering device can occur, the tolerance field for rolled metal foils or metal strips is considerably smaller.

Another advantage of a metal foil, in particular a stainless-steel foil, as a gap width adaptation layer is that with a very smooth metal foil, which is harder than the adjacent elements and is inserted between the at times rougher surfaces on the contact surfaces of the housing plates, the setting force losses are lower than if the rougher housing plates were to rest directly against each other.

The advantage of using metal strips is that they only have to be cut to length to cover at least part of one of the side surfaces of the intermediate element. Preferably only about 80%-90% of the surface is covered with metal strip sections, so that empty spaces remain between them. Since the metal strip is also compressed when the case is tensioned, its dimensions change, including the lateral expansion in the surface of the separation plane. Air trapped in the contact surface can also escape easily through the uncovered surface areas.

A particular advantage results from the use of a displaceable, non-corrosive liquid as a mounting aid. The inner surfaces of the inlet plate and/or outlet plate are wetted with it, at least where the gap adaptation elements are to be placed to form the gap adaptation layer. The liquid provides good adhesion, so that the very thin and thus very light foil sections or metal strip sections are not moved from their position by air movements around the workpieces or by slight movements of the workpieces themselves. The liquid is later completely displaced again when the pretension is applied to the housing, so that it exits laterally and accumulates at most in the gaps between adjacent elements of the gap adaptation layer but has no influence on the gap width. Gel-like adhesives can also be used, but they should not contain any solids as fillers so as not to influence the dimensional accuracy.

To avoid cold welding of the housing elements to the elements in the gap width adaptation layer, it is advantageous to provide the contact surfaces of the housing with nitrided surfaces.

The gap width adaptation layer does not have to consist of one single layer of a material, but can also be formed, for example, from superimposed foils. Furthermore, gap width adaptation layers can also be inserted on both sides of the intermediate plates.

The invention will be explained in more detail below with reference to the drawing. The figures show in detail:

DETAILED DESCRIPTION

Figure 1:
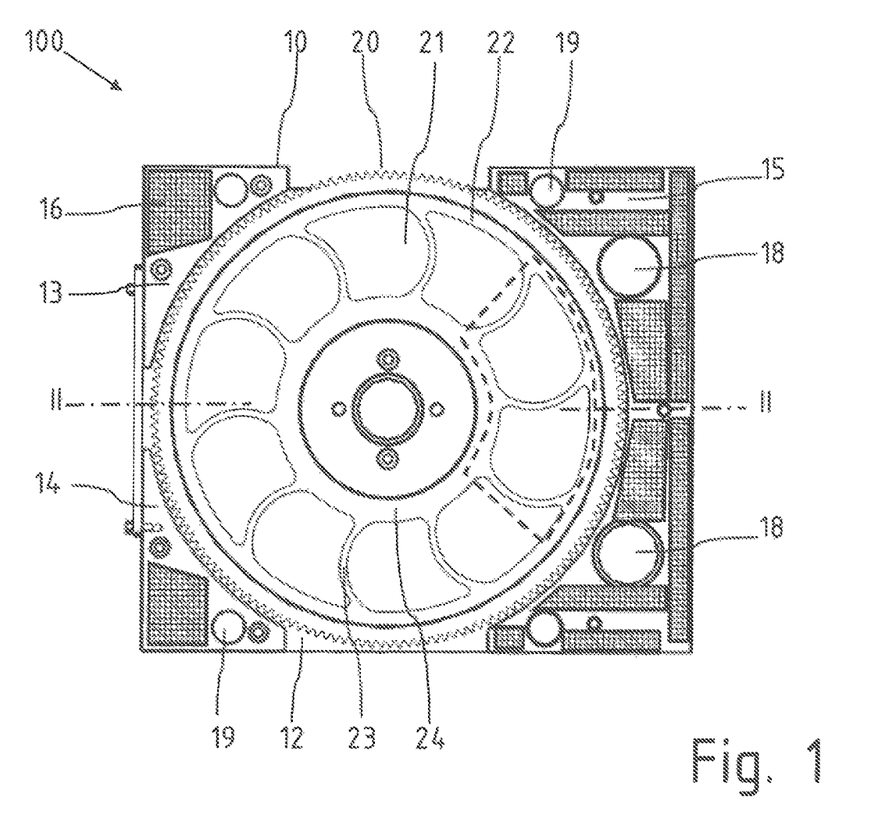
FIG. 1 is a top view of an intermediate level in the filtering device.

FIG. 1 shows parts of a rotary screen filtering device 100 in top view onto an intermediate level. In this case, an inlet plate via which the fluid is guided to screen locations 21 on a rotatable rotary screen 20 is removed from a housing 10. An outlet plate 12 is arranged in the background, via which the fluid is diverted outwards from the respective screen location 21.

The screen locations 21 are each delimited by an inner, annular sealing surface 24 and an outer, annular sealing surface 22 as well as by webs 23, which extend between the inner sealing surface 24 and the outer sealing surface 22.

The rotary screen 20 is framed by two smaller intermediate plates 13, 14 on the left and one larger intermediate plate 15 on the right. In the area of the intermediate plate 15 is the area indicated by the dashed line on the rotary screen 20, flowed through and thus pressurized.

The intermediate plates 13, 14, 15 act as spacer elements between the inlet plate and the outlet plate 12. The areas of screen locations 21 framed by the dashed line are flowed through during production, so that the housing 10 is loaded directly by the internal flow pressure in this area. There, large through holes 18 are provided where clamping bolts can be inserted through the entire package of housing parts and clamped. In addition, several small through holes 19 are arranged around the rotary screen 20 for the screw connections on the housing 10. The contact surface pointing forward in FIG. 1 is covered with several metal foil sections 16 that form a gap width adaptation layer.

Figure 2:
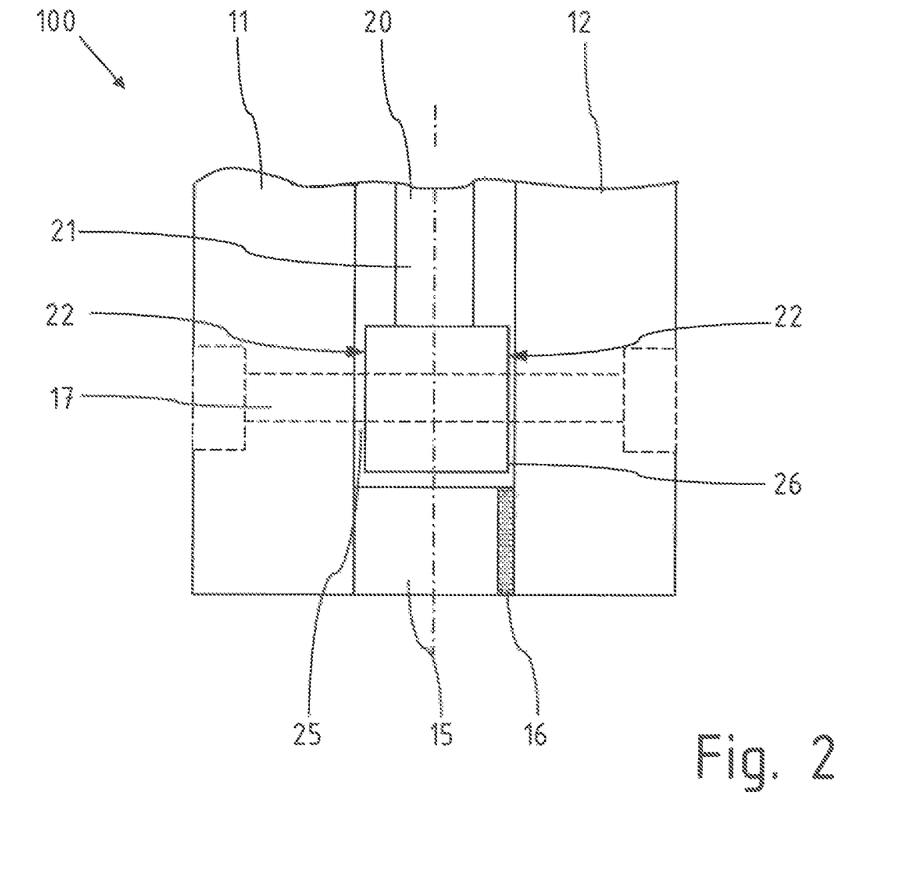
FIG. 2 is a schematic horizontal sectional view through a side portion of the filtering device.

FIG. 2 shows a schematic section according to line II-II at half height in FIG. 1. On the left is the inlet plate 11; on the right the housing outlet plate 12. These are kept at a distance by the intermediate plate 15 inserted in between and the gap width adaptation layer 16, namely at a distance that corresponds to the height of the rotary screen 20 plus the double lubricating gap width between the rotary screen 20 and the inlet or outlet plate.

The rotary screen 20 is somewhat narrower on the outside, so that a gap 25, 26 with a lubricating gap width Δs results between the outer sealing surfaces 24 on the two end faces of the rotary screen 20 and the inner surfaces of the inlet and outlet plates 11, 12. Above it, in the area of screen location 21, the rotary screen is 20 narrower. For the present invention, only the area of the narrow lubricating gap 25, 26 is important, which have a sufficiently high flow resistance to oppose the medium to high viscosity fluid in order to prevent excessive leakage flows.

The problem underlying the invention according to the prior art is explained using FIGS. 3a to 3d:

FIGS. 3a to 3d each show schematically the height or layer thickness of an intermediate element 15 and a rotary screen 20 according to the prior art. The actual heights of the components each have tolerances that are represented by the hatched areas in the lateral end regions. The width of the tolerance fields depends mainly on the used manufacturing process.

Figure 3A:
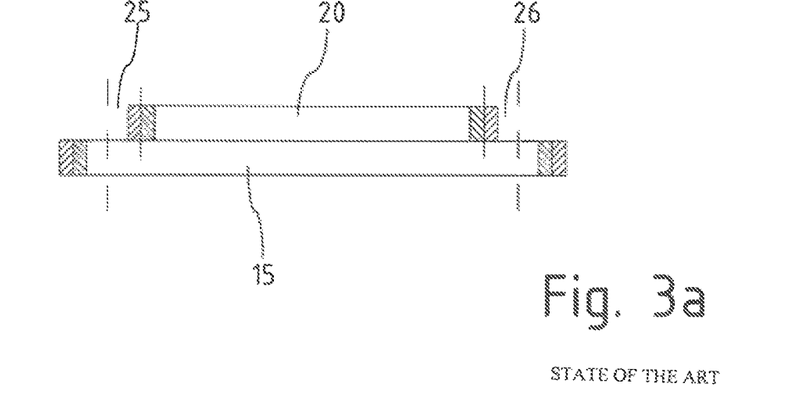
FIGS. 3a-3d are elements of an inner pairing with tolerance fields according to the prior art, each in a schematic view.

FIG. 3a indicates the initial geometries before the pretension indicated by the block arrows is applied. The outer dash-dotted lines indicate the lateral boundary of the calculated intended nominal distance between the inlet and outlet plates 11, 12. Here, the desired gaps 25, 26 follow inwards.

Figure 3B:
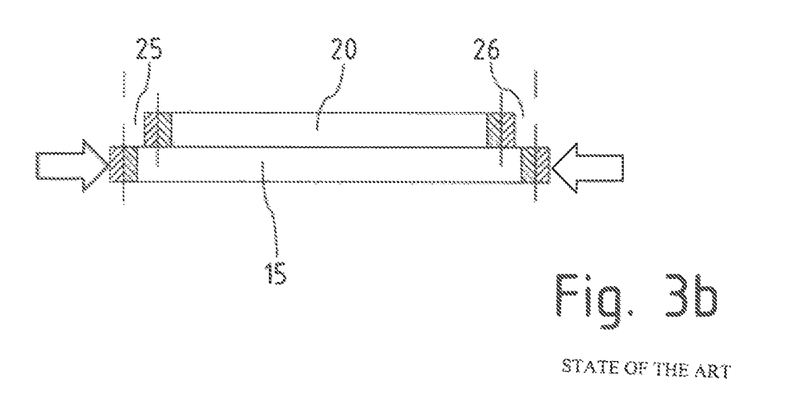

FIG. 3b shows the schematic state after the compression of the intermediate element 15 by applying the pretension indicated by the block arrows. The rotary screen 20 has not been compressed and is therefore unchanged. The intermediate plate 15 of the housing 10, on the other hand, has been compressed to such an extent that the desired nominal gap width of gaps 25 and 26 can be achieved. The distance between the respective centers of the tolerance fields on the intermediate plate 15 corresponds to the nominal distance. However, the calculated gap widths would only be achieved if the actual heights of the elements 15, 20 coincided with the target heights. In fact, however, the heights for each of the elements 15, 20 are individually subject to tolerance.

Figure 3C:
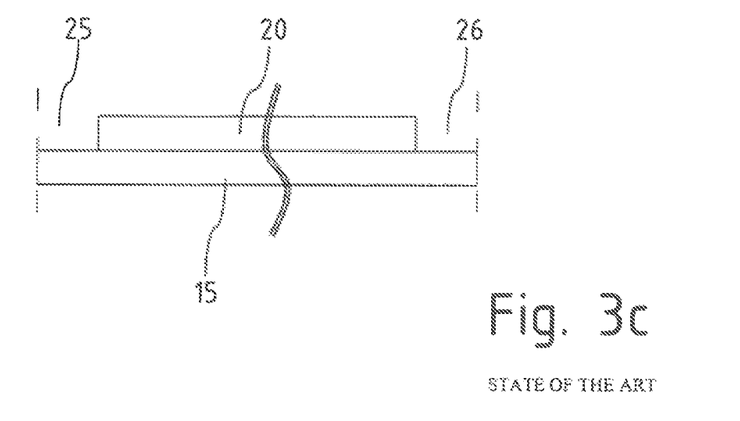

FIG. 3c shows an example of an unfavorable pairing in which an intermediate plate 15 with a maximum height is combined with a rotary screen 20 with a minimum height. The gap width of column 25, 26 is considerably greater than the desired gap width. Larger leakage flows may occur.

Figure 3D:
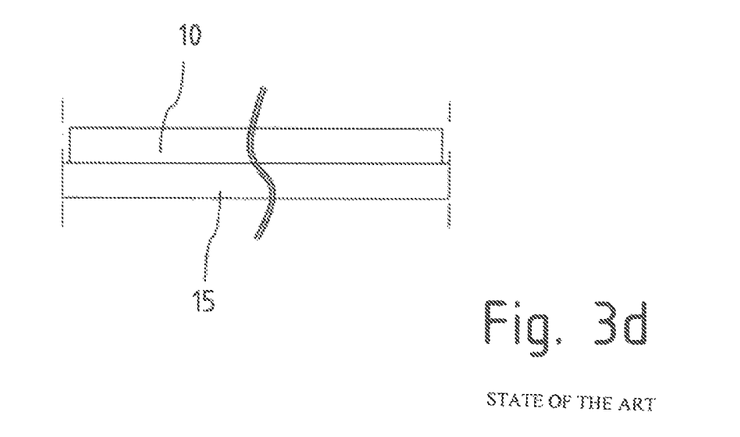

FIG. 3d shows the example of another unfavorable pairing in which an intermediate plate 15 with a minimum height is combined with a rotary screen 20 with a maximum height. Gaps 25, 26 are barely still present here, so that the rotary screen is jammed and cannot be turned, or only with extreme difficulty. The pretension would therefore have to be reduced, risking leakage if a higher internal pressure were to occur, because then the bolt pretension may no longer be able to hold all the layers of the housing close together.

Figure 4A:
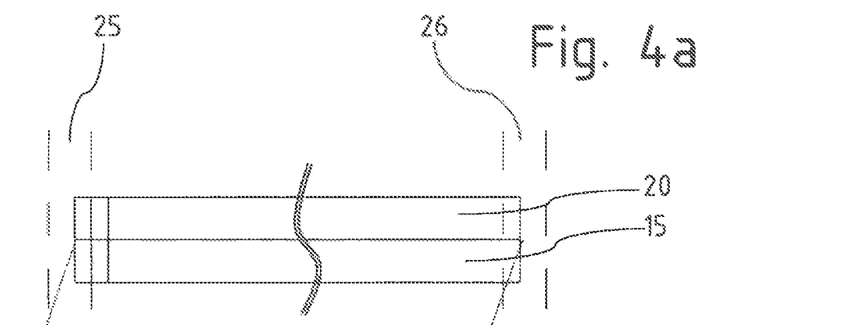
FIGS. 4a-4d are elements of an inner pairing with tolerance fields according to the invention, each in a schematic view.

FIG. 4a shows a rotary screen 20 and an intermediate plate 15 in the same schematic representation as in FIGS. 3a-3d as they are intended according to the invention. Both parts 15, 20 are manufactured in the same clamping and therefore have an identical height or layer thickness and tolerance fields of the same size.

Figure 4B:
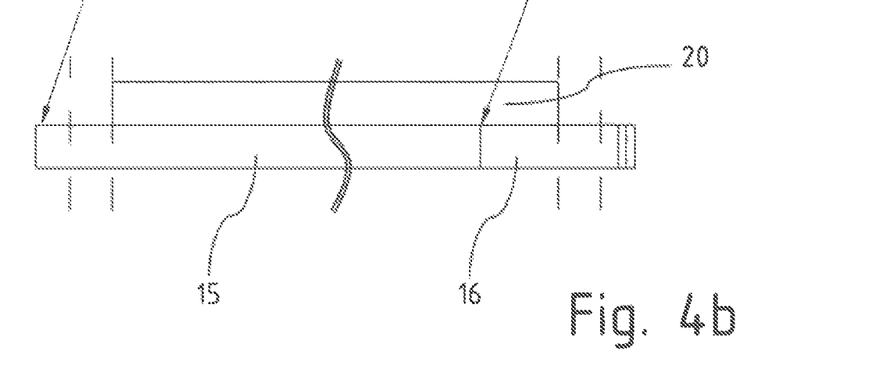

In FIG. 4b, the intermediate plate 15 has been shifted schematically sideways towards an inner surface of the housing so as to be in contact with the adjacent inlet or outlet plate. The intermediate plate 15 has been supplemented by a gap width adaptation layer 16. Compared to the prior art, it has a much narrower tolerance field, which is indicated at its right edge. The respective outer dash-dotted lines indicate the position of the inner surfaces of the adjacent inlet and outlet plates after application of the pretension and thus the outer boundary for the lubricating gaps 25, 26.

Figure 4C:
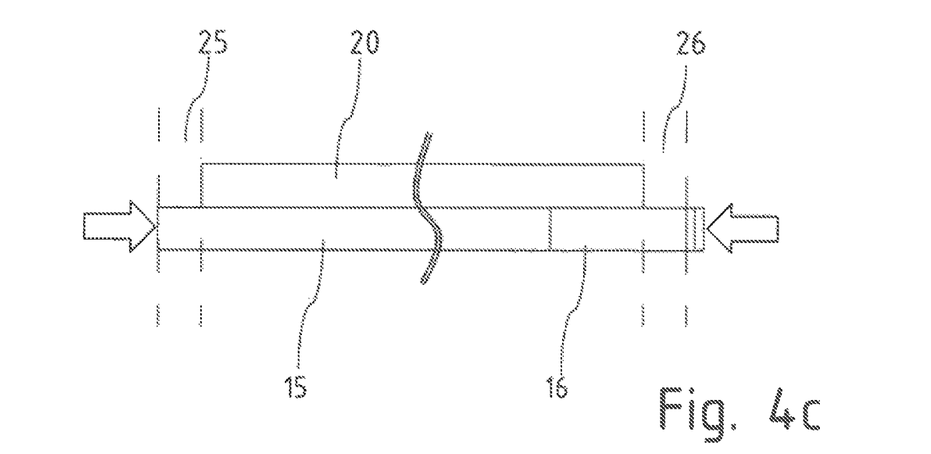

After applying the pretension required for the operating pressure to the housing plates, the height ratios are adjusted according to FIG. 4c. The desired gap widths of gaps 25, 26 are almost achieved. However, the height of the gap width adaptation layer 16 and the pretension are selected so that additional retensioning can be carried out. Even if the actual height in the gap width adjustment layer 16 should be at the lower limit of the tolerance field, as shown in FIG. 4c, the connection is still tight and sufficiently pretensioned for the operating pressure.

Figure 4D:
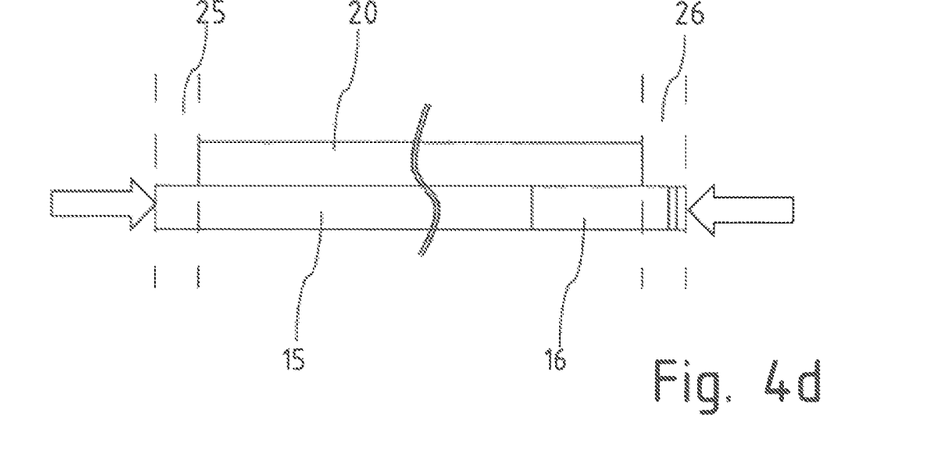

If, on the other hand, the actual height in the gap width adjustment layer 16 is at the upper limit of the tolerance field, and the gap width of gaps 25, 26 is therefore slightly too large, then the compression can be increased and the height reduced to such an extent that the desired nominal dimensions are achieved, as shown in FIG. 4d, by further increasing the pretension, which is indicated by extended block arrows in FIG. 4d.

What is claimed is:

1. A rotary screen filtering device for medium to high viscosity fluids, comprising a rotary screen rotatably mounted in a housing and having at least one flow-through screen element, wherein the housing comprises:
   an inlet plate with at least one inlet channel;
   at least one intermediate plate; and
   an outlet plate with an outlet channel;
      wherein the plates are screwed together via a plurality of screw bolts extending through the package of adjacent plates;
      wherein a first lubricating gap is formed between an inner surface of the inlet plate and a first sealing surface of the rotary screen and a second lubricating gap is formed between an inner surface of the outlet plate and a second sealing surface of the rotary screen,
      and wherein:
         the rotary screen has an identical height as the at least one intermediate plate in the region of the first and second sealing surfaces;
         the screw bolts are pretensioned such that all the plates rest firmly against one another up to a maximum permissible operating pressure; and
         a gap width adaptation layer is inserted between the inlet plate and the at least one intermediate plate and/or between the outlet plate and the at least one intermediate plate.

2. The rotary screen filtering device of claim 1, wherein the gap width adaptation layer is formed by a metal foil.

3. The rotary screen filtering device of claim 2, wherein metal foil sections of the gap width adaptation layer adhere by a non-corrosive adhesive to a contact surface on the inlet or outlet plate or on the at least one intermediate plate.

4. The rotary screen filtering device of claim 2, wherein the gap width adaptation layer is formed by a plurality of metal foil sections positioned side by side around through holes.

5. The rotary screen filtering device of claim 4, wherein the plurality of metal foil sections adhere by a non-corrosive adhesive to a contact surface on the inlet or outlet plate or on the at least one intermediate plate.

6. The rotary screen filtering device of claim 2, wherein the gap width adaptation layer is formed by a cold-rolled stainless-steel foil.

7. The rotary screen filtering device of claim 6, wherein the gap width adaptation layer is formed by a plurality of metal foil sections positioned side by side around through holes.

8. A sealing and mounting method for a rotary screen filtering device for medium to high viscosity fluids, comprising a rotary screen rotatably supported in a housing and having at least one screen location, wherein the housing comprises an inlet plate having at least one inlet channel, at least one intermediate plate and an outlet plate having at least one outlet channel, the at least one intermediate plate having a first sealing surface that faces the inlet plate and a second sealing surface that faces the outlet plate and the rotary screen having a first sealing surface that faces the inlet plate and a second sealing surface that faces the outlet plate, the method comprising:
   manufacturing the at least one intermediate plate and the rotary screen with identical heights with respect to the first and second sealing surfaces of the rotary screen and the first and second sealing surfaces of the at least one intermediate plate;
   selecting, for screw bolts, a pretension such that all plates are close to each other up to a maximum permissible operating pressure;
   inserting a respective gap width adaptation layer between at least one of the inlet and outlet plate and the at least one intermediate plate, wherein a thickness of the gap width adaptation layer is selected in accordance with the elastic deformation of the plates at the selected pretension plus a lubricating gap width in at least one of a first gap between an inner surface of the inlet plate and the first sealing surface of the rotary screen and a second gap between an inner surface of the outlet plate and the second sealing surface of the rotary screen; and
   screwing together the plates with the selected pretension via a plurality of the screw bolts extending through the pack of adjacent plates.

9. The sealing and mounting method of claim 8, wherein the gap width adaptation layer is formed by a metal foil.

10. The sealing and mounting method of claim 9, wherein the metal foil serving as the gap width adaptation layer is secured to the plates with a non-corrosive, displaceable liquid prior to screwing.

11. The sealing and mounting method of claim 9, wherein the gap width adaptation layer is formed by a plurality of metal foil sections arranged around the screw bolts.

12. The sealing and mounting method of claim 11, wherein the metal foil serving as the gap width adaptation layer is secured to the plates with a non-corrosive, displaceable liquid prior to screwing.

13. The sealing and mounting method of claim 9, wherein the gap width adaptation layer is formed by a cold-rolled steel foil.

14. The sealing and mounting method of claim 13, wherein the metal foil serving as the gap width adaptation layer is secured to the plates with a non-corrosive, displaceable liquid prior to screwing.

15. The sealing and mounting method of claim 13, wherein the gap width adaptation layer is formed by a plurality of metal foil sections arranged around the screw bolts.

16. The sealing and mounting method of claim 15, wherein the metal foil serving as the gap width adaptation layer is secured to the plates with a non-corrosive, displaceable liquid prior to screwing.

* * * * *